US012311676B2

(12) United States Patent
Martin et al.

(10) Patent No.: US 12,311,676 B2
(45) Date of Patent: May 27, 2025

(54) ACTIVE CIRCUIT ELEMENTS ON A MEMBRANE

(71) Applicant: Hewlett-Packard Development Company, L.P., Spring, TX (US)

(72) Inventors: Eric T. Martin, Corvallis, OR (US); James R. Przybyla, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 163 days.

(21) Appl. No.: 18/032,535

(22) PCT Filed: Oct. 23, 2020

(86) PCT No.: PCT/US2020/057169
§ 371 (c)(1),
(2) Date: Apr. 18, 2023

(87) PCT Pub. No.: WO2022/086563
PCT Pub. Date: Apr. 28, 2022

(65) Prior Publication Data

US 2023/0382127 A1 Nov. 30, 2023

(51) Int. Cl.
*B41J 2/18* (2006.01)

(52) U.S. Cl.
CPC .............. *B41J 2/18* (2013.01); *B41J 2202/12* (2013.01); *B41J 2202/13* (2013.01)

(58) Field of Classification Search
CPC ...... B41J 2/18; B41J 2/14145; B41J 2/14072; B41J 2202/13; B41J 2202/12
See application file for complete search history.

(56) References Cited

U.S. PATENT DOCUMENTS

| | | | |
|---|---|---|---|
| 6,193,344 | B1 | 2/2001 | Otsuka et al. |
| 6,412,921 | B1 | 7/2002 | Manini |
| 6,431,685 | B1 | 8/2002 | Misumi |
| 6,547,371 | B2 | 4/2003 | Silverbrook |
| 6,663,221 | B2 | 12/2003 | Anagnostopoulos et al. |
| 9,555,653 | B2 | 1/2017 | Kanno |
| 9,597,871 | B2 | 3/2017 | Ike |
| 9,862,187 | B1 | 1/2018 | Mu et al. |
| 2002/0075359 | A1 | 6/2002 | Wuu et al. |
| 2009/0040257 | A1 | 2/2009 | Bergstedt et al. |
| 2011/0242219 | A1 | 10/2011 | Nepomnishy et al. |
| 2012/0160925 | A1 | 6/2012 | Hoisington et al. |
| 2012/0268526 | A1 | 10/2012 | Huffman et al. |

(Continued)

FOREIGN PATENT DOCUMENTS

EP 1211076 A2 6/2002

*Primary Examiner* — An H Do
(74) *Attorney, Agent, or Firm* — Foley & Lardner LLP

(57) ABSTRACT

According to examples, an apparatus may include a substrate having a fluid recirculation channel and a membrane adjacent to the fluid recirculation channel, in which the membrane is portion of the substrate having a smaller thickness than other portions of the substrate. The apparatus may also include a component layer, in which a fluid ejection chamber may be formed in the component layer. The fluid ejection chamber may include a nozzle and fluid may be received into the fluid ejection chamber through an inlet port and recirculated to the fluid recirculation channel through an outlet port. The apparatus may further include active circuit elements formed on the membrane, in which the active circuit elements may control ejection of fluid from the fluid ejection chamber through the nozzle.

15 Claims, 3 Drawing Sheets

APPARATUS
100

APPARATUS
101

(56) References Cited

U.S. PATENT DOCUMENTS

| | | | |
|---|---|---|---|
| 2013/0249987 | A1 | 9/2013 | Ottosson et al. |
| 2014/0063132 | A1 | 3/2014 | Scheffelin et al. |
| 2018/0037029 | A1 | 2/2018 | Hirayama |
| 2019/0001699 | A1 | 1/2019 | Nakakubo et al. |

ACTIVE CIRCUIT ELEMENTS ON A MEMBRANE

CROSS-REFERENCE TO RELATED APPLICATIONS

This application is a U.S. National Stage Patent Application under 35 U.S.C. 371 that claims priority to PCT/US2020/057169, filed Oct. 23, 2020, which is hereby incorporated by reference in its entirety.

BACKGROUND

Fluid ejection devices may eject fluid drops via nozzles in the fluid ejection devices. Such fluid ejection devices may include fluid actuators that may be actuated to thereby cause ejection of drops of fluid through nozzle orifices of the nozzles. Some example fluid ejection devices may be printheads, where the fluid ejected may correspond to ink.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1A:
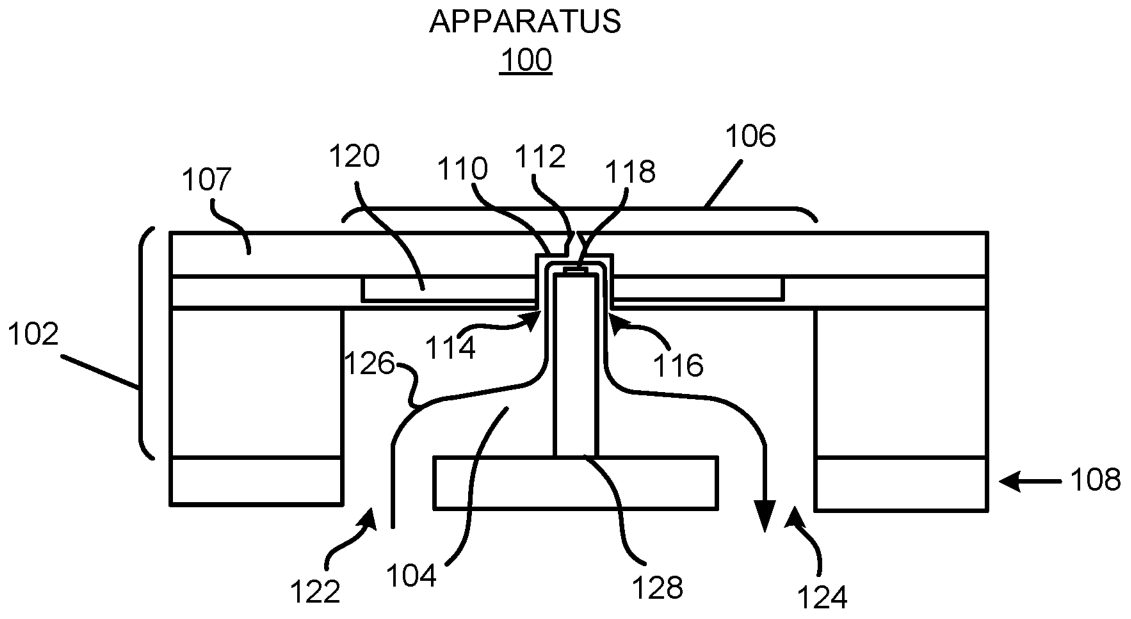
FIGS. 1A and 1B, respectively, depict block diagrams of example apparatuses that may include active circuit elements formed on a membrane that is adjacent to a fluid recirculation channel.

For simplicity and illustrative purposes, the principles of the present disclosure are described by referring mainly to examples thereof. In the following description, numerous specific details are set forth in order to provide an understanding of the examples. It will be apparent, however, to one of ordinary skill in the art, that the examples may be practiced without limitation to these specific details. In some instances, well known methods and/or structures have not been described in detail so as not to unnecessarily obscure the description of the examples. Furthermore, the examples may be used together in various combinations.

Throughout the present disclosure, the terms "a" and "an" are intended to denote one of a particular element or a plurality of the particular element. As used herein, the term "includes" means includes but not limited to, the term "including" means including but not limited to. The term "based on" means based in part on or based entirely on.

Disclosed herein are apparatuses, such as fluid ejection devices, that may include a membrane that is located adjacent to a fluid recirculation channel. The membrane may be a portion of a substrate (e.g., a substrate of a fluidic die) that is thinner than other portions of the substrate. The substrate may also include a component layer that may be formed on the membrane. In some types of apparatuses, a fluid ejection chamber including a nozzle and a fluid actuator may be formed in in the component layer, in which the fluid ejection chamber is to receive a fluid from the fluid recirculation channel through an inlet port. In other types of apparatuses, a chamber for micro-recirculation may be formed in the component layer, in which the micro-recirculation chamber may not include a nozzle and/or the fluid actuator and may receive a fluid from the recirculation channel through the inlet port. Fluid in the fluid ejection chamber and in instances in which a micro-recirculation chamber is provided, the micro-recirculation chamber, may be recirculated back into the fluid recirculation channel through an outlet port.

According to examples, active circuit elements may be formed on the membrane, in which the active circuit elements may control ejection of fluid from the fluid ejection chamber through the nozzle. The active circuit elements may be formed on the membrane through performance of implant operations on the membrane. In various examples, the active circuit elements may include a transistor, a diode, an implant resistor, a metal-oxide-semiconductor capacitor, a combination thereof, and/or the like. As the active circuit elements may be formed in the membrane, the active circuit elements may be formed in an area of a fluidic die substrate that is thinner than other areas of the fluidic die substrate.

In contrast, known fluidic die may include fluidic elements contained in fluidic architecture regions that do not include active circuit elements. The known fluidic die may be partitioned into the fluidic architecture regions and circuit regions that are outside of the fluidic architecture regions. The active circuit regions may include active circuit elements. Partitioning a fluidic die between fluidic architecture regions and circuit regions may simplify the interface between the circuit elements and the fluidic elements, or may be performed because of the arrangement of fluid feed slots in the fluidic die. A fluid feed slot may refer to a fluid conduit that may run along an entire actuator column of the fluidic die. The fluid feed slot may be used to carry fluid to and from the fluidic elements of the fluidic die.

As used here, an "active circuit element" may refer to a device that may be switched between different states, such as an on state at which electrical current flows through the device, and off state at which electrical current does not flow through the device (or the amount of electrical current flow is negligible or below a specified threshold). An example of an active circuit element is a transistor, such as a field effect transistor (FET). A transistor has a gate that is connected to a signal ("gate signal") to control the state of the transistor. When the gate signal is at an active level (e.g., a low voltage or a high voltage depending on the type of transistor used), the transistor turns on to conduct electrical current between two other nodes of the transistor (e.g., a drain node and a source node of an FET). On the other hand, if the gate signal is at an inactive level (e.g., a high voltage or a low voltage depending on the type of transistor used), then no electrical current flows through the transistor (or the amount of electrical current through the transistor is negligible or below a specified threshold). In some cases, the gate signal to the transistor may be set at an intermediate level between the active level or the inactive level, which causes the transistor to conduct an intermediate amount of electrical current.

Another example of an active circuit element is a diode. If the voltage across two nodes of the diode exceeds a threshold voltage, then the diode turns on to conduct electrical current through the diode. However, if the voltage across that the two nodes of the diode is less than the threshold voltage, and the diode remains off.

In some examples, the apparatuses may include a plurality of fluid ejection chambers and/or micro-recirculation chambers. The fluid ejection chambers and/or micro-recirculation chambers may be fluidically coupled to a fluid inlet channel and a fluid outlet channel such that, for instance, fluid may be recirculated through the fluid ejection chambers and/or micro-recirculation chambers via the fluid inlet channel and the fluid outlet channel. In one regard, therefore, fluid may not remain stagnant in the fluid ejection chambers and/or micro-recirculation chambers, which may prolong the life of the fluid actuators in the fluid ejection chambers, may maintain and/or increase the quality of images formed by the ejected fluid, and/or the like. In addition, the active circuit elements that may control actuation of fluid actuators in the fluid ejection chambers may be formed on membranes of the apparatuses, in which the membranes may be thinner than substrates of the apparatuses, which may enable, for instance, different nozzle placement arrangements, larger numbers of active circuit elements, and/or the like.

Figure 1B:
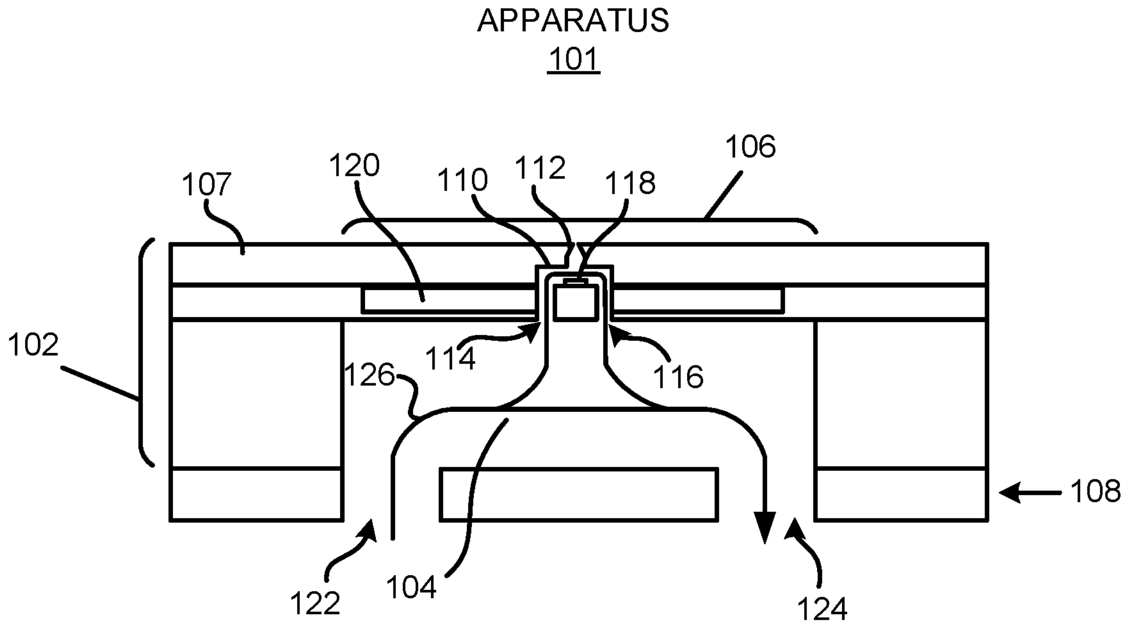

Reference is first made to FIGS. 1A and 1B, which respectively depict block diagrams of example apparatuses 100, 101 that may include active circuit elements formed on a membrane that is adjacent to a fluid recirculation channel. It should be understood that the example apparatuses 100, 101 depicted in FIGS. 1A and 1B may include additional features and that some of the features described herein may be removed and/or modified without departing from the scopes of the apparatuses 100, 101.

Each of the apparatuses 100, 101 may be part of a fluid ejection device, a fluidic die, and/or the like. In some examples, the apparatuses 100, 101 may be part of a two-dimensional printer and may eject a fluid, such as ink or other suitable fluid for printing onto a print medium such as paper. In other examples, the apparatuses 100, 101 may be part of a three-dimensional printer and may eject a fluid, such as ink or other agent for printing onto build material particles.

As shown in FIGS. 1A and 1B, the apparatuses 100, 101 may include a fluidic die substrate 102 (which is also referenced herein as a substrate 102) within which a fluid recirculation channel 104 may be formed. In addition, the substrate 102 may include a membrane 106 that may have a relatively smaller thickness than the substrate 102. The membrane 106 may be defined as the area denoted by the brackets in FIGS. 1A and 1B. That is, the substrate 102 may have a first thickness and the membrane 106 may have a second thickness, in which the second thickness is smaller than the first thickness. The substrate 102 may further include a component layer 107 that may be formed on the membrane 106. The apparatuses 100, 101 may further include an interposer layer 108 that may be formed to be planar with the substrate 102, in which the fluid recirculation channel 104 may be formed between the interposer layer 108 and the membrane 106.

The substrate 102, the membrane 106, and/or the interposer layer 108 may each be a silicon based wafer or other such similar materials used for microfabricated devices (e.g., glass, gallium arsenide, plastics, etc.). In addition, various microfabrication and/or micromachining processes may be performed on the substrate 102, the membrane 106, the interposer layer 108 and layers of material to form the substrate 102, the membrane 106, and the interposer layer 108. Moreover, the component layer 107 may be formed on the membrane 106 and the substrate 102 through any of various fabrication techniques.

Additional processes may be performed on the substrate 102, the membrane 106, and the interposer layer 108 to form other features of the apparatus 100. For instance, microfluidic channels and fluid feed holes, and/or the like, may be formed in the substrate 102, the membrane 106, and/or the interposer layer 108. The fluid recirculation channel 104 as well as other microfluidic channels, holes, and/or chambers may be formed by performing etching, microfabrication processes (e.g., photolithography), or micromachining processes. Accordingly, the fluid recirculation channel 104 as well as other microfluidic channels, feed holes, and/or chambers may be defined by surfaces fabricated in the substrate 102, the membrane 106, and/or the interposer layer 108.

Moreover, material layers may be formed on the substrate 102 and/or the membrane 106, and microfabrication and/or micromachining processes may be performed thereon to form fluid structures and/or other components, which are described herein. An example of a material layer may include, for example, the component layer 107, which may be a photoresist layer (e.g., SU-8), in which a fluid ejection chamber 110, a nozzle 112, and a fluid actuator 118 may be formed. Additional structures may be formed in the component layer 107 and/or the membrane 106, such as an inlet port 114 and an outlet port 116, in which the inlet port 114 and the outlet port 116 may be fluidically coupled to the fluid ejection chamber 110 and the fluid recirculation channel 104.

According to examples, the fluid actuator 118 may include a piezoelectric membrane based actuator, a thermal resistor based actuator, an electrostatic membrane actuator, a mechanical/impact driven membrane actuator, a magnetostrictive drive actuator, or other such elements that may cause displacement of fluid responsive to electrical actuation. Active circuit elements 120 may control activation of the fluid actuator 118 and thus ejection of the fluid from the fluid ejection chamber 110 through the nozzle 112. According to examples and as shown in FIGS. 1A and 1B, the active circuit elements 120 may be formed on the membrane 106.

The active circuit elements 120 may include, for instance, a transistor, a diode, a resistor, capacitor, a combination thereof, and/or the like. Particular examples of active circuit elements 120 may include metal-oxide-semiconductor (MOS) transistors, bipolar transistors, diodes, implant resistors, MOS capacitors, and/or the like. In contrast, general or passive circuit elements may include thin film elements such as thin film resistors, thin film capacitors, thin-film interconnects, and/or the like. In any of these examples, the active circuit elements 120 may be formed on the membrane 106 through performance of implant operations on the membrane 106. The implant operations may include, for instance, dosing implant processes, such as n+ or p+ implant processes. In addition or alternatively, some of the active circuit elements 120 may also be formed at sections of the substrate 102.

The apparatuses 100, 101 may also include a fluid inlet hole 122 and a fluid outlet hole 124 formed in the interposer layer 108. In this regard, and as denoted by the arrows 126 in FIGS. 1A and 1B, fluid may flow into the fluid recirculation channel 104 through the fluid inlet hole 122 and may flow out of the fluid recirculation channel 104 through the fluid outlet hole 124. Although not shown, the fluid inlet hole 122 and the fluid outlet hole 124 may be fluidically coupled to a larger channel and/or a fluid source. In addition, the fluid in the fluid recirculation channel 104 may flow into the fluid ejection chamber 110 through the inlet port 114. Moreover, fluid may flow out of the fluid ejection chamber 110 and into the fluid recirculation channel 104 through the outlet port 116.

By recirculating the fluid through the fluid ejection chamber 110, fluid that may have not have been ejected from the fluid ejection chamber 110 through the nozzle 112 may be recirculated back into the fluid recirculation channel 104. In addition, by recirculating the non-ejected fluid back into the fluid recirculation channel 104, drying of the fluid inside of the fluid ejection chamber 110 may be reduced or eliminated, which may prolong the life of the fluid actuator 118, may maintain and/or increase the quality of images formed by the ejected fluid, and/or the like.

The apparatus 100 depicted in FIG. 1A may differ from the apparatus 101 depicted in FIG. 1B in that a divider 128 may divide the fluid recirculation channel 104. As shown, the divider 128 may be provided between the inlet port 114 and the outlet port 116 and may extend to the interposer layer 108. The divider 128 may be part of the substrate 102, e.g., may be formed during formation of the other portions of the substrate 102. As a result, fluid entering the fluid recirculation channel 104 through the fluid inlet hole 122 may flow into fluid ejection chamber 110 through the inlet port 114 and may flow out of the fluid ejection chamber 110 through the outlet port 116 prior to flowing out of the fluid recirculation channel 104 through the outlet hole 124. In contrast, in FIG. 1B, the divider 128 may be omitted and some of the fluid that may flow into the fluid recirculation channel 104 through the inlet port 114 may flow out of the fluid recirculation channel 104 through the outlet hole 124 without flowing through the fluid ejection chamber 110.

Figure 2A:
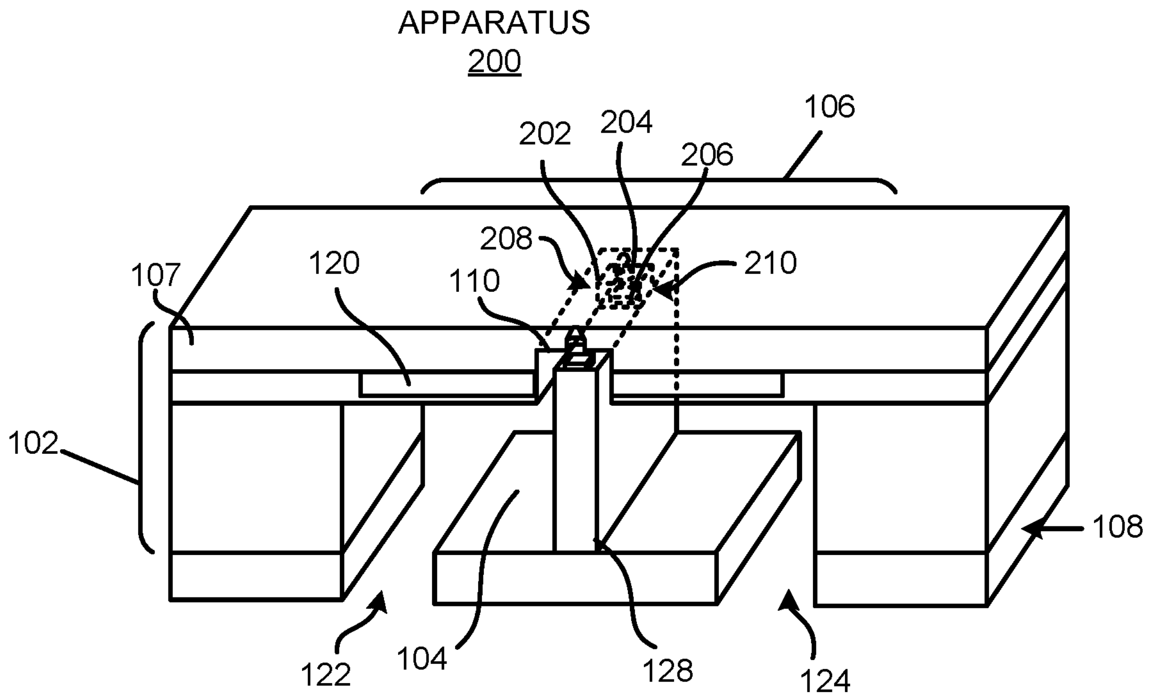
FIG. 2A shows an isometric view of an example apparatus that may include multiple fluid ejection chambers, active circuit elements formed on a membrane that is adjacent to a fluid recirculation channel, and a divider in a fluid recirculation channel.
Figure 2B:
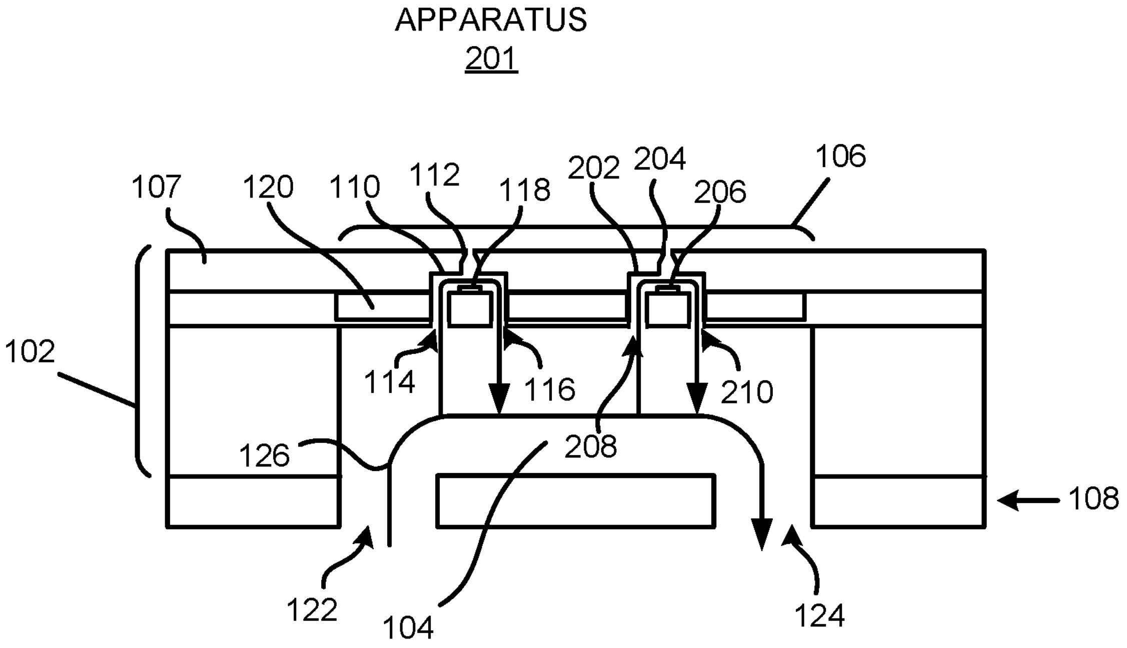
FIG. 2B depicts a block diagram of an example apparatus that may include multiple fluid ejection chambers and active circuit elements formed on a membrane, in which the membrane is adjacent to a fluid recirculation channel.

Reference is now made to FIGS. 2A and 2B. FIG. 2A shows an isometric view of an example apparatus 200 that may include multiple fluid ejection chambers 110, 202, active circuit elements 120 formed on a membrane 106 that is adjacent to a fluid recirculation channel 104, and a divider 128 in a fluid recirculation channel 104. FIG. 2B shows a block diagram of an example apparatus 201 that may include multiple fluid ejection chambers 110, 202 and active circuit elements 120 formed on a membrane 106 that is adjacent to a fluid recirculation channel 104. It should be understood that the example apparatuses 200 and 201 depicted in FIGS. 2A and 2B may include additional features and that some of the features described herein may be removed and/or modified without departing from the scopes of the apparatuses 200, 201.

The apparatuses 200, 201 are depicted as including the same elements as the apparatuses 100, 101 depicted in FIGS. 1A and 1B and thus, the elements having common reference numerals are not described again with respect to FIGS. 2A and 2B. As shown in FIGS. 2A and 2B, the apparatuses 200, 201 may include a second fluid ejection chamber 202 formed in the component layer 107, in which the second fluid ejection chamber 202 may include a second nozzle 204 and a second fluid actuator 206. The second fluid ejection chamber 202, the second nozzle 204, and the second fluid actuator 206 are depicted with dashed lines as these components may not be visible in the view shown in FIG. 2A. The second fluid ejection chamber 202 may also be fluidically coupled to the fluid recirculation channel 104 via a second inlet port 208 and a second outlet port 210.

In FIG. 2A, the second fluid ejection chamber 202 is depicted as being positioned along the length of the divider 128, e.g., parallel with respect to the fluid ejection chamber 110 in the direction in which fluid is to flow through the fluid ejection chambers 110, 202. In this regard, fluid may flow into and out of the second fluid ejection chamber 202 in a manner that is similar to the flow in discussed above with respect to FIG. 1A. In contrast, in FIG. 2B, the second fluid ejection chamber 202 is depicted as being positioned downstream with respect to the fluid ejection chamber 110. In this regard, fluid may flow into and out of the second fluid ejection chamber 202 in a manner that is similar to the flow in discussed above with respect to FIG. 1B.

Although the apparatuses 200, 201 are depicted with two fluid ejection chambers 110, 202 and two nozzles 112, 204, it should be understood that the apparatuses 200, 201 may include additional fluid ejection chambers 110, 202 and nozzles 112, 204 that may be distributed across lengths and widths of the apparatuses 200, 201, which are also referenced herein as fluid ejection devices. In these examples, each of the fluid ejection chambers 110, 202 may be fluidically coupled to the fluid recirculation channel 104. In addition, each of the fluid ejection chambers 110, 202 as well as the active circuit elements 120 that may control the fluid actuators 118, 206 inside of the fluid ejection chambers 110 may be formed in the membrane 106.

Figure 3:
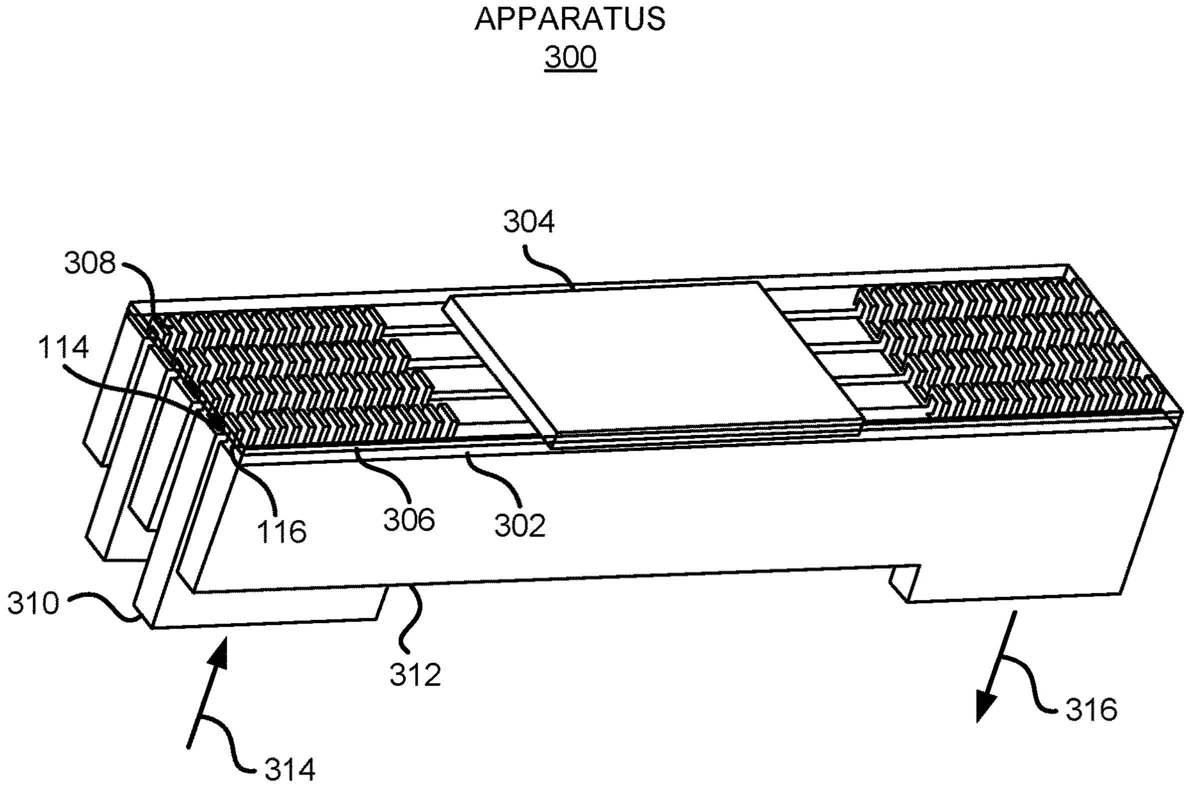
FIG. 3 shows a perspective view of a portion of an example apparatus that may include an example membrane in which active circuit elements may be formed on the membrane.

Reference is now made to FIG. 3, which shows a perspective view of a portion of an example apparatus 300 that may include an example membrane 302 in which active circuit elements 304 may be formed on the membrane 302. It should be understood that the example apparatus 300 depicted in FIG. 3 may include additional features and that some of the features described herein may be removed and/or modified without departing from the scope of the apparatus 300.

According to examples, the membrane 302 may be equivalent to any of the membranes 106 depicted in FIGS. 1A, 1B, 2A, and 2B and thus, the membrane 302 may be a portion of a substrate 102 and may be positioned adjacent to a fluid recirculation channel 104. As shown, the apparatus 300 may also include a component layer 306, in which the membrane 302 and the component layer 306 are depicted as being transparent in FIG. 3 such that the active circuit elements 304 may be visible. Additionally, fluid ejection chambers 308 may be formed in the component layer 306 as discussed herein and are visible in FIG. 3. It should be understood that each of the fluid ejection chambers 308 may be equivalent to the fluid ejection chambers 110, 202 depicted in FIGS. 1 and 2. In this regard, each of the fluid ejection chambers 308 may include a respective fluid actuator 118, a respective nozzle 112, a respective inlet port 114, and a respective outlet port 116.

The membrane 302 is also depicted as being positioned adjacent to fluid inlet channels 310 and fluid outlet channels 312. The fluid inlet channels 310 and the fluid outlet channels 312 may be positioned beneath the membrane 302 and may be equivalent to and/or replace the fluid recirculation channel 104 depicted in FIGS. 1A-2B. As shown in FIG. 3, the fluid inlet channels 310 are fluidically coupled to the inlet ports 114 of the fluid ejection chambers 308 and the fluid outlet channels 312 are fluidically coupled to the outlet ports 116 of the fluid ejection chambers 308. In this regard, fluid may be recirculated through the fluid ejection chambers 308 through flow of the fluid into the fluid ejection chambers 308 from the fluid inlet channels 310 as denoted by the arrow 314 and flow out of the fluid ejection chambers 308 through the fluid outlet channels 312 as denoted by the arrow 316. In addition, fluid inlet channels 310 may be decoupled from the fluid outlet channels 312 other than through the fluid ejection chambers 308.

Although not shown, the fluid inlet channels 310 and the fluid outlet channels 312 may be formed on a substrate 102 between the membrane 302 and an interposer layer 108. In these examples, the fluid inlet channels 310 may be fluidically coupled to a fluid inlet hole 122 and the fluid outlet channels 312 may be fluidically coupled to a fluid outlet hole 124 (FIG. 1A). In addition, although the active circuit elements 304 are shown as being positioned between groups of the fluid ejection chambers 308 in FIG. 3, it should be understood that the active circuit elements 304 may be positioned elsewhere with respect to the fluid ejection chambers 308 without departing from a scope of the apparatus 300. In addition, or alternatively, fluid ejection chambers 308 may be provided across the apparatus 300 or one of the groups of fluid ejection chambers 308 may be removed without departing from a scope of the apparatus 300.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
- a substrate having a fluid recirculation channel formed therein, the substrate comprising:
  - a membrane adjacent to the fluid recirculation channel, wherein the membrane is a portion of the substrate having a smaller thickness than other portions of the substrate; and
  - a component layer formed on the membrane;
- a fluid ejection chamber formed in the component layer, the fluid ejection chamber including a nozzle, wherein fluid is to be received into the fluid ejection chamber through an inlet port and recirculated to the fluid recirculation channel through an outlet port; and
- active circuit elements formed on the membrane, the active circuit elements to control ejection of fluid from the fluid ejection chamber through the nozzle.

2. The apparatus of claim 1, wherein the active circuit elements comprise a transistor, a diode, an implant resistor, a metal-oxide-semiconductor capacitor, and/or a combination thereof.

3. The apparatus of claim 1, wherein the active circuit elements are formed through performance of implant operations on the membrane.

4. The apparatus of claim 1, further comprising:
- a fluid actuator positioned in the fluid ejection chamber, wherein the active circuit elements are to control actuation of the fluid actuator.

5. The apparatus of claim 1, wherein the fluid recirculation channel comprises:
- a fluid inlet channel; and
- a fluid outlet channel, wherein the inlet port is fluidically coupled to the fluid inlet channel and the outlet port is fluidically coupled to the fluid outlet channel.

6. The apparatus of claim 5, further comprising:
- a second fluid ejection chamber formed in the component layer, the second fluid ejection chamber including a second nozzle, wherein a second inlet port is fluidically coupled to the fluid inlet channel and a second outlet port is fluidically coupled to the fluid outlet channel.

7. The apparatus of claim 5, wherein the fluid inlet channel is adjacent to the fluid outlet channel and wherein the fluid outlet channel is fluidically coupled to the fluid inlet channel through the fluid ejection chamber.

8. The apparatus of claim 1, further comprising:
- an interposer layer formed to be planar with the substrate, wherein the fluid recirculation channel is positioned between a portion of the interposer layer and the membrane and wherein a fluid inlet hole fluidically coupled to the fluid recirculation channel and a fluid outlet hole fluidically coupled to the fluid recirculation channel are formed in the interposer layer.

9. A fluid ejection device comprising:
- a substrate having a first thickness, the substrate comprising:
  - a membrane having a second thickness, the second thickness being smaller than the first thickness, wherein the membrane is a portion of the substrate and a fluid recirculation channel is formed in the substrate adjacent to the membrane; and
  - a component layer formed on the membrane portion;
- a plurality of fluid ejection chambers formed in the component layer, each of the fluid ejection chambers including:
  - a nozzle; and
  - a fluid actuator; wherein an inlet port and an outlet port are fluidically coupled to the fluid recirculation channel; and
- active circuit elements formed on the membrane, the active circuit elements to control the fluid actuators to cause fluid to selectively be ejected through the nozzles of the fluid ejection chambers.

10. The fluid ejection device of claim 9, wherein the active circuit elements comprise a transistor, a diode, an implant resistor, a metal-oxide-semiconductor, and/or a combination thereof.

11. The fluid ejection device of claim 9, further comprising:
- a fluid inlet channel; and
- a fluid outlet channel, wherein the inlet ports are fluidically coupled to the fluid inlet channel and the outlet ports are fluidically coupled to the fluid outlet channel.

12. The fluid ejection device of claim 9, further comprising:
- an interposer layer formed to be planar with the substrate, wherein the fluid recirculation channel is positioned between a portion of the interposer layer and the membrane and wherein a fluid inlet hole fluidically coupled to the fluid recirculation channel and a fluid outlet hole fluidically coupled to the fluid recirculation channel are formed in the interposer layer.

13. A fluid ejection device comprising:
- a substrate having a first thickness and a fluid recirculation channel formed therein, the substrate comprising:
  - a membrane forming part of the substrate, the membrane having a second thickness, the second thickness being smaller than the first thickness; and
  - a component layer formed on the membrane;
- a plurality of fluid ejection chambers formed in the component layer, each of the fluid ejection chambers including:
  - a nozzle; and
  - a fluid actuator, wherein an inlet port and an outlet port are fluidically coupled to the fluid recirculation channel;

fluid inlet channels formed fluidically coupled to the inlet ports;

fluid outlet channels formed fluidically coupled to the outlet ports; and active circuit elements formed on the membrane, the active circuit elements to control the fluid actuators to cause fluid to selectively be ejected through the nozzles of the fluid ejection chambers.

14. The fluid ejection device of claim 13, wherein the active circuit elements comprise a transistor, a diode, an implant resistor, a metal-oxide-semiconductor, and/or a combination thereof.

15. The fluid ejection device of claim 13, further comprising:

an interposer layer formed to be planar with the substrate, wherein the fluid inlet channels and the fluid outlet channels are positioned between a portion of the interposer layer and the membrane and wherein a fluid inlet hole fluidically coupled to the fluid inlet channels and a fluid outlet hole fluidically coupled to the fluid outlet channels are formed in the interposer layer.

* * * * *